United States Patent [19]

Mirabile et al.

[11] 3,903,470

[45] Sept. 2, 1975

[54] SYSTEM FOR SORTING ELECTRIC SIGNALS IN THE FORM OF TRAINS OF OSCILLATING AS A FUNCTION OF THEIR AMPLITUDE AND TIME DISTRIBUTION

[75] Inventors: Manlio Mirabile; Franco Paglini, both of Rome, Italy

[73] Assignee: Centro Sperimentale Metallurgico S.p.A., Rome, Italy

[22] Filed: Mar. 4, 1974

[21] Appl. No.: 448,045

[30] Foreign Application Priority Data

May 9, 1973 Italy.................................. 48720/73

[52] U.S. Cl.............. 324/77 A; 324/103 P; 324/133
[51] Int. Cl.$^2$.......................................... G01R 23/16
[58] Field of Search.............. 324/77 A, 103 P, 133; 328/116, 117; 307/235

[56] References Cited
UNITED STATES PATENTS

| | | | |
|---|---|---|---|
| 2,636,983 | 4/1953 | Poole................... | 328/116 |
| 3,341,816 | 9/1967 | Davis................... | 328/116 |
| 3,532,977 | 10/1970 | Giordano............ | 324/77 A |
| 3,772,515 | 11/1973 | Soini.................... | 328/116 |

Primary Examiner—Alfred E. Smith
Assistant Examiner—Michael J. Tokar
Attorney, Agent, or Firm—Young & Thompson

[57] ABSTRACT

A circuit for analyzing the time behavior and amplitude distribution of electric signals which may typically be trains of damped oscillations produced by a signal source such as a piezo-electric transducer which after amplification and possibly filtering to eliminate unwanted signal frequency components are applied to the inputs of a plurality of voltage comparators which have threshold values arranged in increasing scale. The output signals are processed so that for each train of oscillations a signal is produced related to the highest swing of the oscillatory signal in said train of damped oscillations. The inhibition of the outputs relating to the swings having an amplitude lower than the maximum one in a given train is obtained by means of an arrangement of one-shot circuits, flip-flops and coincidence gates by which only one output is obtained on a set of output terminals correlated with the plurality of threshold levels of said plurality of voltage comparators.

8 Claims, 5 Drawing Figures

SYSTEM FOR SORTING ELECTRIC SIGNALS IN THE FORM OF TRAINS OF OSCILLATING AS A FUNCTION OF THEIR AMPLITUDE AND TIME DISTRIBUTION

The present invention relates to a circuit for analyzing the time behaviour and the energy distribution of non stationary physical phenomena.

More particularly this invention relates to a circuit for analyzing electric signals formed by trains of damped oscillations, with a stochastic behaviour of recurrence, of the maximum amplitudes and of the frequency components.

The non stationarity is a characteristic of several physical phenomena and its study is often very important for understanding the mechanisms producing said phenomena.

The concerned phenomena are normally translated into electrical terms by means of transducers which are different depending upon the type of studied phenomenon.

However, in many cases, the available transducers show a transfer function whereby it is impossible to obtain a faithful translation in electric terms of the observed physical phenomenon. For instance, it is possible to cite the case of the physical phenomenon known as acoustic emission in metal deformation and fracture. The transducer used in the study of the acoustic emission consists normally of a piezoelectric transducer which is mechanically coupled to the metal test piece which is tested, while said test piece is submitted to mechanical stresses. Said stresses induce phenomena of movement of dislocations followed by the formation and propagation of cracks causing the emission of mechanical energy. The time behaviour of this emission, per se of step or impulsive type will be, on the contrary, converted by the piezoelectric transducer into a train of damped oscillations the maximum and the frequencies of which are related with the amount and frequency fundamental component of the emitted mechanical energy, respectively.

The main purpose of the present invention is that of providing a circuit for analyzing the signals coming from these transducers, said circuit allowing the several drawbacks shown by other equipment already known for studying analogous phenomena, to be obviated.

Even if in the present disclosure reference is made to the acoustic emission as the physical phenomenon giving rise to the trains of electric oscillations which are analyzed by the circuit according to the present invention, it is to be understood that the circuitry hereinafter described can be applied to the analysis of electric signals having another origin. By way of example it is possible to cite geophysical prospection, the study of radar echoes, the analysis of vibrations and so on.

In known equipment of this kind, included in a first class, simply the total count of the oscillations induced on the piezo-electric transducer by the delivery of mechanical energy will be effected, and then arbitrarily a ratio will be assumed between the number of oscillations and the number of events, which generated said oscillations. In other known equipment, of a second class, besides the count of the oscillations, a correlation, strictly incorrect, will be made between distribution of the amplitudes of the single oscillations and the energy delivered by each single event.

In each case both types of equipment introduce unacceptable approximations and produce results which can hardly be interpreted and which are often conflicting.

The purpose of the present invention is that of supplying a circuit for the analysis of the output signals from a piezoelectric transducer during the test of metal materials subjected to mechanical stresses, said circuit being capable of obviating the inconveniences occurring with the equipment of known types.

The equipment according to the present invention includes means which, after have analyzed the amplitudes of the single oscillations appearing in a train of oscillations related to an event, are capable of establishing what is the maximum amplitude contained in the wave packet, as well as of supplying data concerning their repetition rate.

According to the present invention, the equipment includes a system for sorting electric signals in the form of trains of oscillations as a function of their amplitude and time distribution, including a signal source associated with a plurality of voltage comparator circuits arranged according to a series of increasing threshold values and producing an output signal whenever the said signal source provides a signal having an amplitude greater than the threshold value associated therewith, and including a plurality of flip flops controlled on a first trigger input thereof by said voltage comparator circuits and a plurality of differentiating circuits and coincidence circuits actuated by said flip-flops and associated with two adjacent threshold values of the discrete signal levels defined by said comparator circuits, said circuits producing an output signal after a given time interval only in that coincidence circuit for which a given threshold value is exceeded by said electric signal which has exceeded the associated immediately lower threshold value but not the immediately higher threshold value, wherein with each of said flip-flops adapted to be controlled by a first trigger input by one of said voltage comparator circuits associated with a predetermined threshold value, a coincidence circuit is associated which is controlled jointly by means of the signal appearing on said first trigger input and the signal appearing on the output of said flip-flop, the output of said coincidence circuit being connected through a first time delay circuit having a delay time matched to the nature of the electric signals to be processed, and through a differentiating circuit with a first control input of a further coincidence circuit associated with the output of said circuit corresponding to said predetermined threshold value, a second control input of said further coincidence circuit being connected through a second time-delay circuit having a longer time delay than said first time-delay circuit, with the said voltage comparator circuit associated with the next higher threshold value, the output of said second time-delay circuit being also connected to a second control input of said flip-flop.

The present invention will be now described with reference to one preferred embodiment disclosed by way of non limitative example, and according to the attached drawings where:

Figure 1:
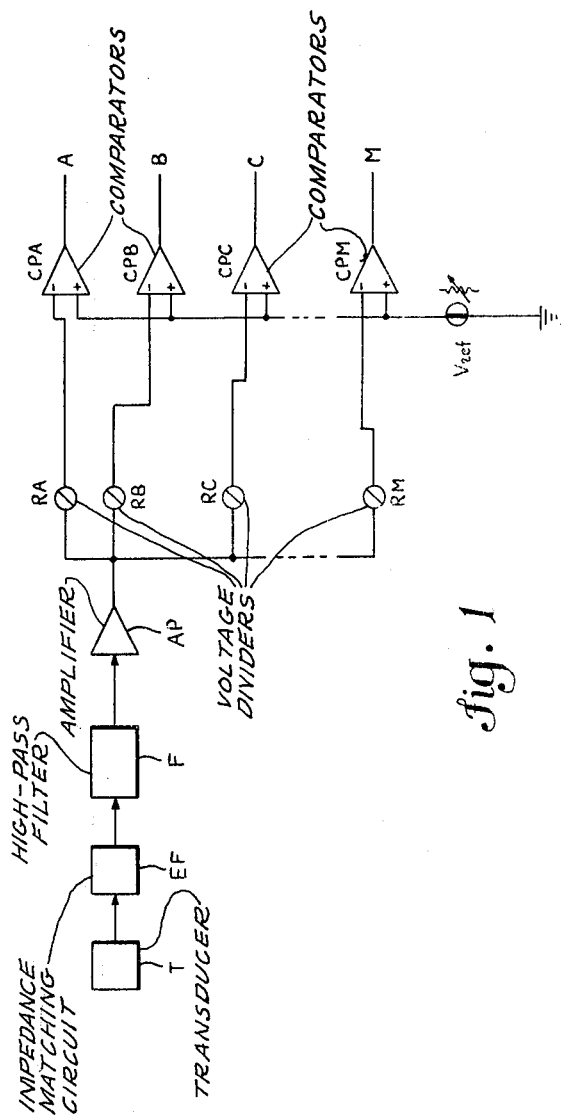
FIG. 1 shows a simplified block diagram of the input and preprocessing circuits of the signals appearing at the output of a piezoelectric transducer.
Figure 2:
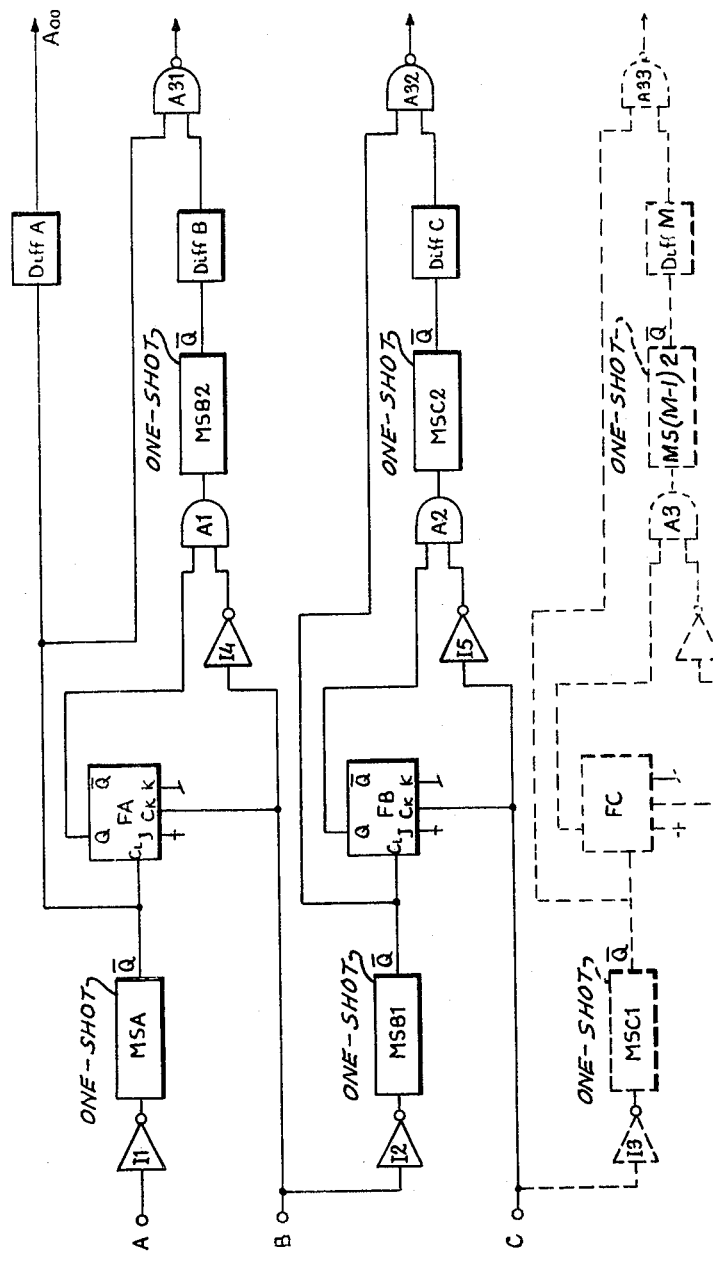
FIG. 2 shows a block diagram of the analyzing circuit proper for the signals to be analyzed.
Figure 3:
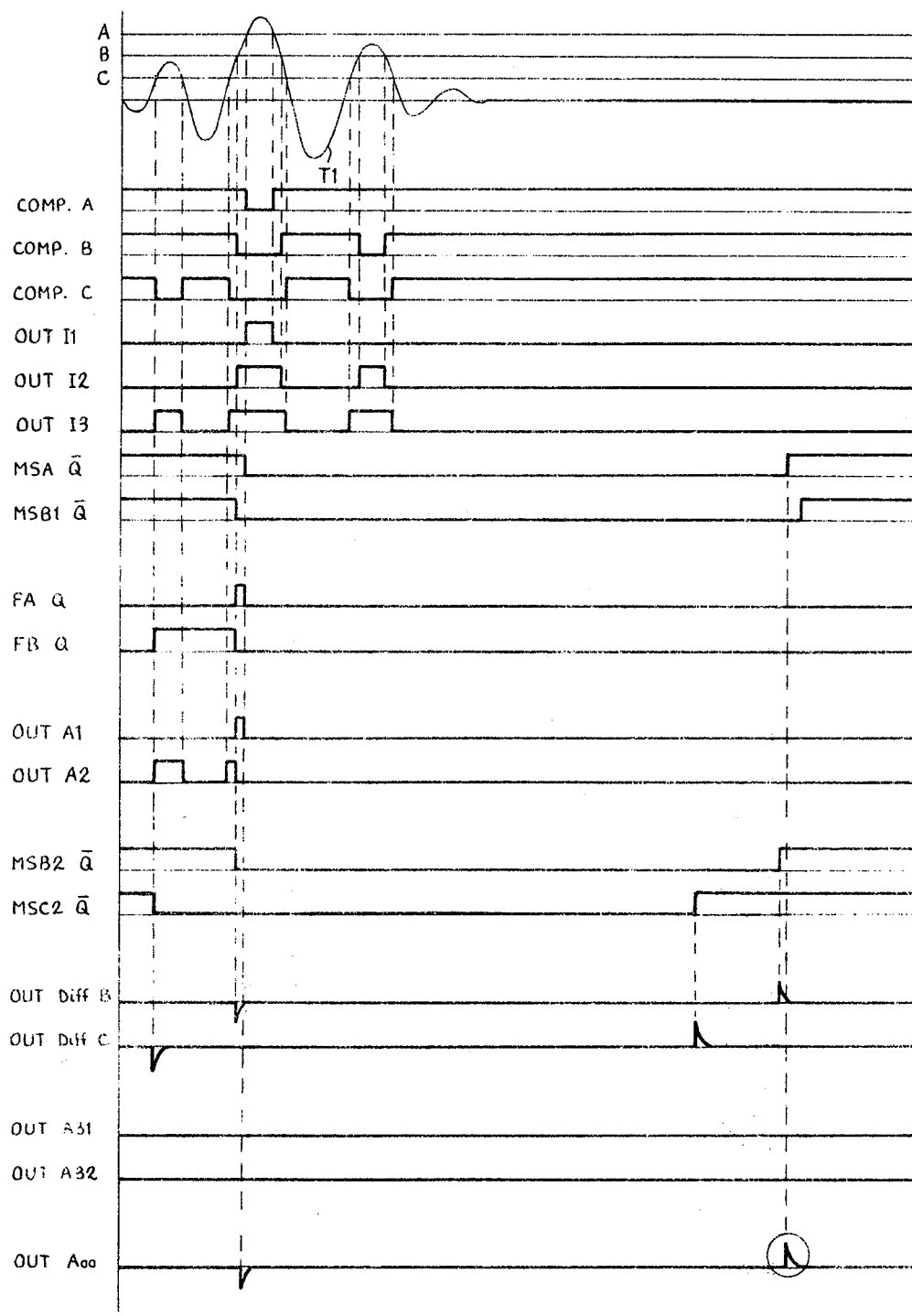
Figure 3:
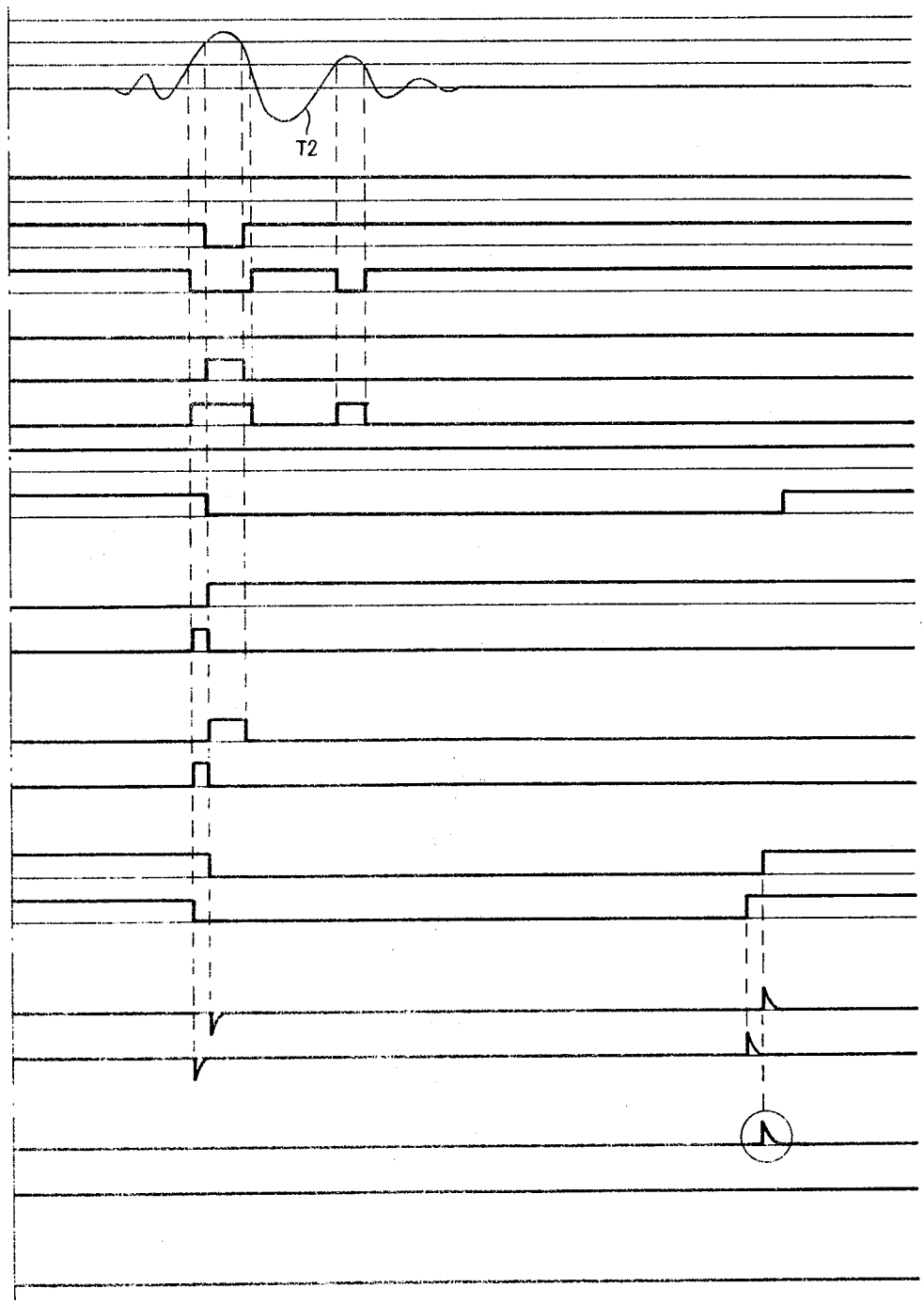
Figure 4:
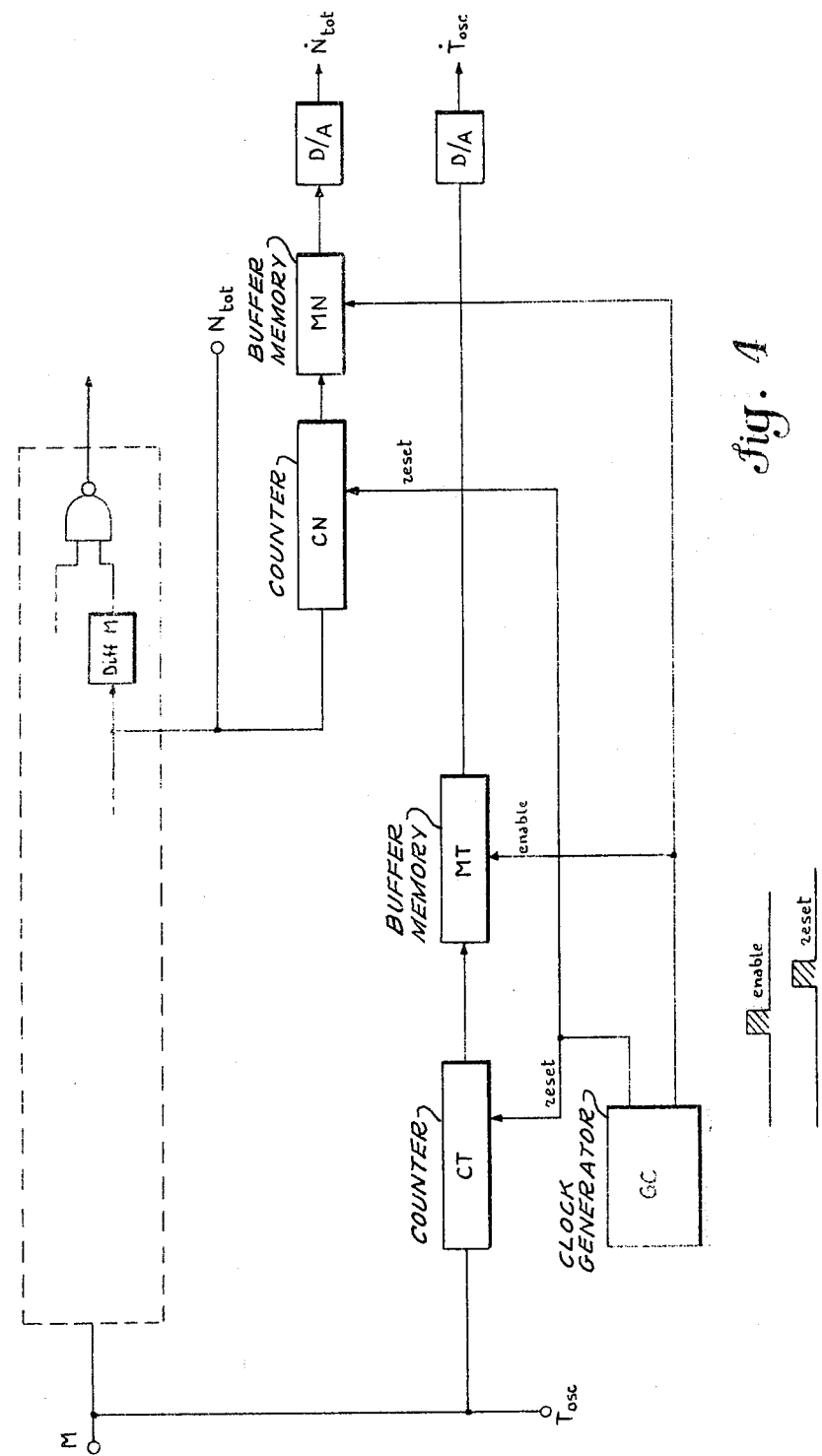

FIGS. 3 and 3' shows waveforms illustrating the operation of the circuits of FIGS. 1 and 2; and FIG. 4 shows a simplified block diagram of further circuits useful for analyzing the signals according to the present invention.

With reference to FIG. 1 the electric signals are obtained from a transducer T consisting of an element of piezoelectric material for instance of the PZT type. The signals coming from the transducer, after impedance matching in the circuit EF are applied to a band pass or high pass filter F with a lower cut off frequency so selected as to separate the useful frequency signals, which represent the events to be studied, from the noise signals produced for instance by the operation of the machine for applying mechanical stresses to metallic test pieces. In a practical example, a cut off frequency of 8 KHz has been selected.

At the output from the filter F a buffer amplifier AP is located with a dynamic range selected as a function of the expected swing of the signals present at the output from the filter F.

To the output from the amplifier AP are connected a group of resistive dividers RA, RB, RC, . . . RM in order to supply signals having different amplitudes to the comparators CPA, CPB, CPC, . . . CPM, so that the comparators will provide an output signal each time the signal applied to the inverting input exceeds the reference voltage applied to the non-inverting input. Of course the arrangement could be reversed, and the dividers arranged on the reference voltages of the comparators and the output from the amplifier AP could be directly connected to the comparators CP.

By this circuit each time the voltage at the input of the comparators CP exceeds the prefixed threshold value, on the outputs therefrom there will appear a transition of logical level HIGH → LOW according to the common terms known to a person skilled in the art (positive logic).

In the following disclosure, for the sake of simplicity and clearness reference will be made to three levels of comparison, denoted level A, level B, level C, in decreasing order of amplitude. It will be clear to a skilled person in the art that the circuit can be repeated depending upon the resolution as required in terms of amplitude.

Reference will now be made to FIGS. 2 and 3. In the wave forms of FIG. 3 two trains of damped oscillations have been shown with envelopes having different amplitudes, denoted by T1, T2. The amplitudes of comparison are shown by the reference lines A, B, C. In the diagram of FIG. 2, it will be noted that with the exception of the channel A related to the highest levels, each processing channel includes a chain formed by a first one shot, a flip-flop of the JK type, a second one shot, a differentiator and a gate NAND as fundamental components.

The circuit of FIG. 2 will be now described together with its operation as shown by the wave forms of FIG. 3.

It is to be noted that the train of oscillations T1 involves at different times the three comparison levels A, B, C. The outputs from the comparators CPA, CPB, CPC will go to LOW level each time and for the whole time when the signal T1 exceeds the respective thresholds A, B, C.

At the output from the inverters I1, I2, I3, there will be signals complementary to those appearing at the output from the comparators. (It is assumed that the one shots in the circuit are triggered by the transitions LOW → HIGH and that the clock of the flip-flops will operate as is known in the HIGH → LOW transitions). Accordingly the one shots MCS1, MSB 1, MSA will be triggered in order. The wave forms relative to the output $\overline{Q}$ from said one shots are shown in FIG. 3. In the described example, the one shots MSA, MSB2, MSC2 have a holding time of 100 microseconds, while the one shots MSB1, MSC1 have a holding time of 105 microseconds. All the described one shots are of the "non retriggerable" type. At the first passing of the lower threshold C, the flip-flop FB will be set and its output Q goes to HIGH. Simultaneously, the signal from the comparator C comes to the output from the inverter I5 and therefore the gate AND A2 being HIGH and the Q of FB causes the one shot MSC2 to trigger. Subsequently, the level B will be involved. The logic signal LOW on the output terminal of the comparator CPB, inverted by the inverter I2 causes the triggering of the one shot MSB1, the output $\overline{Q}$ from which goes to the LOW level resetting the flip flop FB and inhibiting the gate NAND A32. Simultaneously, the flip flop FA will be carried to SET and, by the sequence as previously described, through the inverter I4 and the gate AND A1, now actuated, the one shot MSB2 will be caused to trigger.

Subsequently, the level A will be involved. The transition HIGH → LOW after the inversion in the inverter I1 causes the triggering of the one shot MSA, the output $\overline{Q}$ of which goes to LOW value. Since the output $\overline{Q}$ from the one shot MSA is at LOW value, the gate NAND A 31 is inhibited. Simultaneously, also the flip flop FA will be reset. Thereafter the circuit will be insensitive to the further oscillations of the wave train T1, whatever be its amplitudes, as these will involve lower levels than the level A. Only at the end of the holding time of the one shots will a new sequence of operations be initiated, as it will be described later on.

The diagram of FIG. 2 shows that the outputs $\overline{Q}$ of the one shots MSB2, MSC2 are connected through differentiators DiffB, DiffC, respectively, to one of the inputs of the gates NAND A31, A32. Through the channel A, the output $\overline{Q}$ from the one shot MSA is AOO. to the differentiator DiffA and then to the output A00.

The one shots MSB2, MSC2, MSA, when arriving at the end of their holding cycle (the output $\overline{Q}$ goes to HIGH value) produce a pulse at the output from the relative differentiators (the negative pulses have no importance). It is to be noted (FIG. 3) that the output from the differentiator DiffB comes to the gate NAND A 31, inhibited as the one shot MSA has its output $\overline{Q}$ still at LOW level, the output from the differentiator DiffC is in the same conditions as the gate NAND A32 is still inhibited. Therefore the sole output pulse available will be the pulse at the output from the differentiator DiffA at the end of holding time of the one shot MSA. This sole output corresponds to the maximum level (comparator CP) passed by the oscillations of the train of oscillations T1, and therefore correlated to the maximum of the envelope of the oscillations of the train T1. The pulse on the output AOO will be therefore relative to a physical event which released energy at the maximum level of the dynamics of the apparatus.

Let use assume that a second train of oscillations is present, giving rise to a train of damped oscillations denoted by T2 in FIG. 3'. The train of oscillations T2 has a maximum of envelope lower than the maximum level in the chosen example and it will pass only the threshold B. Accordingly only the sole comparators CPB, CPC will intervene. The one shot MSA will not intervene and therefore the gate NAND A31 will never be inhibited. The flip flop FA will be carried to SET and will remain in that condition actuating the gate AND A1, in order to allow the one shot MSB2 to trigger. Apart from these differences, the same operations as previously described will be carried out. At the end of the holding times of the several one shots, the sole output relative to the differentiator DiffB will be able to pass through the gate NAND A31. There will be, accordingly, a pulse at the output A31 relative to a physical event which delivered energy up to a certain value intermediate the maximum of the dynamics of the equipment and the lowest sensitivity level.

Two important characteristics must be noted:

a. The discrimination relative to the sole highest level of the train of oscillations;

b. The resistance, once a certain level has been passed, to subsequent trespassings of that identical level (but not upper levels) or of lower levels through the holding time of the several one shots.

The holding time has been selected in a practical embodiment, at about 100 microseconds, this being in accordance with the fact that trains of waves have been analyzed having a dynamic of about 70 dB coming from a transducer having a merit factor Q about 30 and a resonance frequency about 1 MHz.

In the considered embodiment, the events occurring with a repetition rate greater than about 100 KHz will be erroneously processed as in the most favourable case a new intervention can be anticipated only after a time greater than about 100 microseconds.

Of course the holding time of the one shots can be modified in order to adapt the equipment to the analysis of different kinds of phenomena.

If the circuitry according to this invention is used for studying the acoustic emission in materials subjected to stresses, additive circuits can be provided as shown in FIG. 4.

As it is shown in this figure, to the M . . th channel (with the lowest threshold level) a connection is made, upstream of the differentiator DiffM, whereon pulses are available corresponding to all physical events occurring in the material. This output has been denoted $N_{tot}$. For sake of completeness it is also useful to provide an output measuring also the total count of the oscillations induced on the transducer. This output, $T_{osc}$ is directly connected to the output of the comparator relative to the lowest level (M . . th).

A further useful circuitry consists in providing means for evaluating the increments in a defined time interval of the number of events $N_{tot}$ and of $T_{osc}$. For obtaining the latter values, the counters CN, CT are provided, which are periodically reset to zero by a clock generator Gc which supplies both the reset pulses of the counters CN, CT, and the enabling pulses for buffer memories MN, MT. The outputs from the buffer memories MN, MT are connected to digital/analogic converters in order to supply an analogic signal for further processing.

Furthermore, should the arrangement according to this invention be used for studying the acoustic emission during tests on materials, it would be possible to provide deformation or stress sensors which operating in a known way, will supply signals capable of being correlated to the signals produced by the other circuitry components as previously described.

Having thus described the present invention, what is claimed is:

1. A system for sorting electric signals in the form of trains of oscillations as a function of their amplitude and time distribution, including a signal source associated with a plurality of voltage comparator circuits arranged according to a series of increasing threshold values and producing an output signal whenever the said signal source provides a signal having an amplitude greater than the threshold value associated therewith, and including a plurality of flip-flops controlled on a first trigger input thereof by said voltage comparator circuits and a plurality of differentiating circuits and coincidence circuits actuated by said flip-flops, and associated with two adjacent threshold values of the discrete signal levels defined by said comparator circuits, said circuits producing an output signal after a given time interval only in that coincidence circuit for which a given threshold value is exceeded by said electric signal which has exceeded the associated immediately lower threshold value but not the immediately higher threshold value, wherein with each of said flip-flops adapted to be controlled by a first trigger input by one of said voltage comparator circuits associated with a predetermined threshold value, a coincidence circuit is associated which is controlled jointly by means of the signal appearing on said first trigger input and the signal appearing on the output of said flip-flop, the output of said coincidence circuit being connected through a first time delay circuit having a delay time matched to the nature of the electric signals to be processed, and through a differentiating circuit with a first control input of a further coincidence circuit associated with the output of said circuit corresponding to said predetermined threshold value, a second control input of said further coincidence circuit being connected through a second time-delay circuit having a longer time delay than said first time-delay circuit, with the said voltage comparator circuit associated with the next higher threshold value, the output of said second time-delay circuit being also connected to a second control input of said flip-flop.

2. A circuit as claimed in claim 1, wherein said time delay circuits consist of non retriggerable one shot circuits.

3. A circuit as claimed in claim 1, wherein said flip flops are JK type flip flops.

4. A circuit as claimed in claim 1 wherein said signal source comprises a transducer connected through a high pass filter to an amplifier the dynamics of which is so selected as to include all toggle threshold levels of said voltage comparators.

5. A circuit according to claim 1 wherein totalizing means of the said oscillation swings are provided, including a counter connected to the output relative to the lowest comparison level.

6. A circuit as claimed in claim 5, further comprising means for measuring the variation in the unit of time of said counting comprising counter means operatively connected to a buffer memory, said counter means and said buffer memory being associated with a clock generator for periodically resetting and actuating said counter and said buffer memory, respectively.

7. A circuit as claimed in claim 1 characterized in comprising totalizing means for the number of oscillations of the input signal above the lowest comparison level, comprising a counter connected to the output from the voltage comparator relative to the lowest level.

8. A circuit as claimed in claim 6, further comprising means for measuring the variation in the unit of time of the count, said counter comprising further counter means operatively connected to a buffer memory both connected to a repetition rate generator arranged to reset and actuate periodically respectively, said counter and said buffer memory.

* * * * *